US009405985B1

(12) United States Patent
Burry et al.

(10) Patent No.: US 9,405,985 B1
(45) Date of Patent: Aug. 2, 2016

(54) LEVERAGING CHARACTER-BY-CHARACTER IMAGE CLASSIFIERS TO IMPROVE LICENSE PLATE STATE IDENTIFICATION (71) Applicant: Xerox Corporation, Norwalk, CT (US)

(72) Inventors: Aaron M. Burry, Ontario, NY (US); Vladimir Kozitsky, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/660,255

(22) Filed: Mar. 17, 2015

(51) Int. Cl.
| G06K 9/00 | (2006.01) |
| G06K 9/18 | (2006.01) |
| G06K 9/78 | (2006.01) |
| G06K 9/32 | (2006.01) |
| H04N 7/18 | (2006.01) |
| G06K 9/03 | (2006.01) |

(52) U.S. Cl.
CPC .............. *G06K 9/18* (2013.01); *G06K 9/00791* (2013.01); *G06K 9/03* (2013.01); *G06K 9/32* (2013.01); *G06K 9/3233* (2013.01); *G06K 9/3241* (2013.01); *G06K 9/3258* (2013.01); *G06K 9/78* (2013.01); *H04N 7/18* (2013.01); *G06K 2209/01* (2013.01); *G06K 2209/15* (2013.01)

(58) Field of Classification Search
CPC .......... G06K 2209/15; G06K 2209/01; G06K 9/6279; G06K 9/325; G06K 9/34; G06K 9/342; G06K 9/6232; G06K 9/72; B60R 25/305; G08G 1/0175
See application file for complete search history.

(56) References Cited

U.S. PATENT DOCUMENTS

| 8,447,112 | B2 | 5/2013 | Paul et al. |
| 8,483,440 | B2 | 7/2013 | Fan et al. |
| 8,644,561 | B2 | 2/2014 | Burry et al. |
| 8,792,682 | B2 | 7/2014 | Fan et al. |
| 2012/0148105 | A1 | 6/2012 | Burry et al. |
| 2012/0155712 | A1* | 6/2012 | Paul ......................... G06K 9/00 382/105 |
| 2013/0204719 | A1 | 8/2013 | Burry et al. |

(Continued)

FOREIGN PATENT DOCUMENTS

| CN | 102163287 | * | 8/2011 | ............... G06K 9/66 |
| CN | 102346847 | * | 2/2012 | ............... G06K 9/00 |

OTHER PUBLICATIONS

Paul et al., "Application of the SNoW machine learning paradigm to a set of transportation imaging problems", Jan. 2012, Proc. SPIE 8305, Visual Information Processing and Communication III, 830512-1-830512-11.*

(Continued)

*Primary Examiner* — Amara Abdi
(74) *Attorney, Agent, or Firm* — Kermit D. Lopez; Luis M. Ortiz; Ortiz & Lopez, PLLC (57) ABSTRACT

Methods and systems for enhancing the accuracy of license plate state identification in an ALPR (Automated License Plate Recognition) system. This is accomplished through use of individual character-by-character image-based classifiers that are trained to distinguish between the fonts for different states. At runtime, the OCR result for the license plate code can be used to determine which character in the plate would provide the highest discriminatory power for arbitrating between candidate state results. This classifier is then applied to the individual character image to provide a final selection of the estimated state/jurisdiction for the plate.

20 Claims, 6 Drawing Sheets

(56) References Cited

U.S. PATENT DOCUMENTS

| | | |
|---|---|---|
| 2013/0294652 A1 | 11/2013 | Fan et al. |
| 2013/0294653 A1 | 11/2013 | Burry et al. |
| 2013/0294654 A1 | 11/2013 | Burry et al. |
| 2014/0348392 A1 | 11/2014 | Burry et al. |

OTHER PUBLICATIONS

Artan et al, ("Efficient SMQT Features for Snow-Based Classification on Face detection and Character recognition Task", 2012 IEEE, pp. 45-49).*

* cited by examiner

|   | NH/MA | NH/ME | MA/ME |
|---|---|---|---|
| a | 0.9149 | 0.9403 | 0.9401 |
| b | 0.9029 | 0.9754 | 0.9506 |
| c | 0.9476 | 0.8761 | 0.9359 |
| d | 0.8827 | 0.9665 | 0.9306 |
| e | 0.9205 | 0.8805 | 0.8942 |
| f | 0.8907 | 0.9339 | 0.9508 |
| g | 0.9877 | 0.967 | 0.9686 |
| h | 0.8784 | 0.8995 | 0.875 |
| i | 0.9081 | 0.8845 | 0.8182 |
| j | 0.886 | 0.8635 | 0.8801 |
| k | 0.9334 | 0.9322 | 0.9727 |
| l | 0.7776 | 0.7906 | 0.8024 |
| m | 0.9596 | 0.972 | 0.9453 |
| n | 0.9118 | 0.8558 | 0.9362 |
| o | 0 | 0 | 0 |
| p | 0.9212 | 0.928 | 0.9543 |
| q | 0 | 0 | 0 |
| r | 0.9717 | 0.9263 | 0.9667 |
| s | 0.9232 | 0.8551 | 0.9419 |
| t | 0.8258 | 0.8333 | 0.8664 |
| u | 0 | 0 | 0 |
| v | 0.8659 | 0.9196 | 0.9371 |
| w | 0.976 | 0.9696 | 0.9787 |
| x | 0.8681 | 0.9331 | 0.9018 |
| y | 0.8301 | 0.917 | 0.9215 |
| z | 0.8008 | 0.8979 | 0.8963 |

LEVERAGING CHARACTER-BY-CHARACTER IMAGE CLASSIFIERS TO IMPROVE LICENSE PLATE STATE IDENTIFICATION

TECHNICAL FIELD

Embodiments are generally related to the field of ALPR (Automated License Plate Recognition). Embodiments are additionally related to OCR (Optical Character Recognition) and image classification.

BACKGROUND OF THE INVENTION

ALPR is an image-processing approach that often functions as the core module of "intelligent" transportation infrastructure applications. License plate recognition techniques, such as ALPR, can be employed to identify a vehicle by automatically reading a license plate utilizing image processing and character recognition technologies. A license plate recognition operation can be performed by locating a license plate in an image, segmenting the characters in the captured image of the plate, and performing an OCR (Optical Character Recognition) operation with respect to the characters identified.

The ALPR problem is often decomposed into a sequence of image processing operations: locating the sub-image containing the license plate (i.e., plate localization), extracting images of individual characters (i.e., segmentation), and performing optical character recognition (OCR) on these character images. In order for OCR to achieve high accuracy, it is necessary to obtain properly segmented characters.

The ability to extract license plate information from images and/or videos is fundamental to the many transportation business. Having an ALPR solution can provide significant improvements for the efficiency and throughput of a number of transportation related business processes.

A key component of any ALPR system is the ability to identify the state or jurisdiction of the license plate. Together with the plate code (string), the state uniquely identifies the license plate and its associated tag holder.

Figure 1:
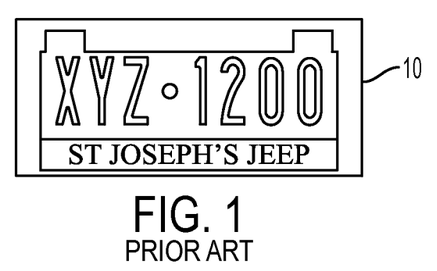
FIG. 1 illustrates an example prior art image of a license plate in which the frame about the license plate obscures the state or jurisdictional name.

There are many challenges associated with accurately identifying the state of origin for the license plate. First, many vehicles these days have frames around the license plate that can obscure the written state name or motto. For example, FIG. 1 illustrates a prior art image 10 of a license plate in which the frame about the license plate obscures the state or jurisdictional name.

Figure 2:
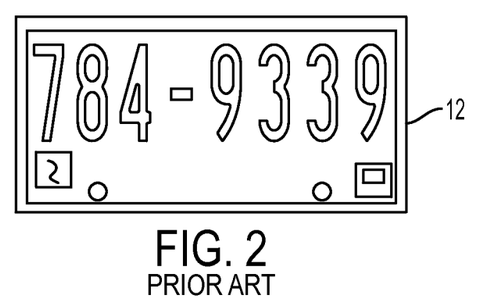
FIG. 2 illustrates an example prior art license plate image having a blur and a lack of contrast.
Figure 3:
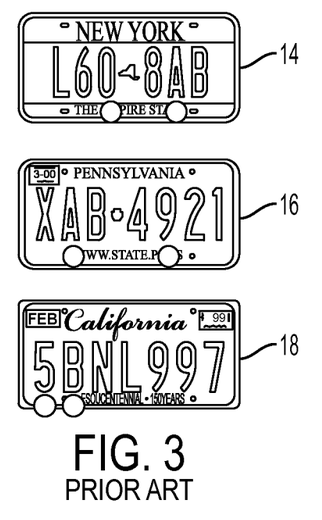
FIG. 3 illustrates example prior art images for comparing fonts across three states for symbols "4" and "A" in accordance with an embodiment.

Other issues includes a lack of contrast and blur in captured images that can make it extremely difficult to recognize the state directly from the content outside the main plate characters. FIG. 2, for example, illustrates a prior art license plate image 12 having a blur and a lack of contrast. FIG. 3 illustrates sample prior art images 14, 16, 18 that compare fonts across three states for symbols "4" and "A" in accordance with an embodiment. FIG. 3 thus indicates that font issues also can present problems.

To combat these issues, the mainline technology in some ALPR systems leverages sequence information from the license plate string to determine the state of origin. In particular, the format of the character sequence (e.g., three letters followed by four numbers) along with the starting character in the sequence provides good performance for many applications. Since many states have their own unique formats and sequences, this type of an approach can provide accurate performance for many installations. A classifier is learned from training data that enables accurate prediction of the state based only on character sequence/format information. An example of this approach is disclosed in U.S. Patent Application Publication No. 2014/0348392 entitled "Method and System for Automatically Determining the Issuing State of a License Plate," which published on Nov. 27, 2014 to Aaron Michael Burry, et al., and is incorporated herein by reference in its entirety.

There are several major limitations to this prior state of the art approach. First, as states increasingly issue more license plates, there is less separation between their valid sequences. For instance, the standard passenger car plate for both New York and Pennsylvania is three letters followed by four numbers ("LLL-NNNN"). The starting character for valid PA sequences begins with the letter "G" and up (e.g. "GAB-1234", "HAB-1234", etc.) whereas for NY the valid sequences start with the letter "A" (e.g. "AAB-1234", "BAB-1234", etc.). Unfortunately, as New York continues to issue new plates, they are in a sense "using up" the separation between the valid sequences for NY and PA. In other words, NY has started to issue plates that start with "G", thereby creating confusion between NY and PA plates from the perspective of prior ALPR state identification methods.

Another limitation of the prior state of the art is that ALPR installations are looking to support recognition of more and more "out of jurisdiction" plates. Typically, for any given ALPR system the recognition engine is trained to support the main state and a handful, say five or six, surrounding states. Other plates have historically been considered out of jurisdiction and not eligible for automation. However, market forces are pushing towards supporting more and more states to enable higher and higher levels of automation. As we expand the set of supported states for any given installation, the opportunity for "overlap" between the formats and valid sequences grows. This is a stress on the accuracy of the existing state identification methods.

Part of the prior art disclosed in U.S. Patent Application Publication No. 2014/0348392 also involves leveraging information from the OCR step to assist in state identification. In particular, since the font can vary substantially from state to state, it is typical to train multiple OCR engines, each tuned to a particular state font. At runtime, all of the OCR engines are run in parallel and the one with the highest confidence result is selected as the "winner". By incorporating this font selection information, the method of U.S. Patent Application Publication No. 2014/0348392 has demonstrated a benefit over just the mask plus starting character (MSC) technique alone. Unfortunately, the font selection information from a typical parallel OCR system alone is insufficient to provide the accuracy required by the ALPR market.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved ALPR method and system.

It is another aspect of the disclosed embodiments to provide for methods and systems for improving the accuracy of state identification within an ALPR system.

It is yet another aspect of the disclosed embodiments to provide for methods and systems for leveraging character-by-character image classifiers to improve license plate state identification.

The aforementioned aspects and other objectives and advantages can now be achieved as described herein. Methods and systems for enhancing the accuracy of license plate state identification in an ALPR (Automated License Plate Recognition) system are accomplished through use of individual character-by-character image-based classifiers that are trained to distinguish between the fonts for different states. At runtime, the OCR result for the license plate code can be used to determine which character in the plate would provide the highest discriminatory power for arbitrating between candidate state identification results. This classifier can then be applied to the individual character image to provide a final selection of the estimated state/jurisdiction for the plate.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

As indicated in the background section, the existing MSC (Mask plus Starting Character) technique for state identification provides accurate performance until the valid character sequences across states begin to experience a heavy overlap. The font selection information from OCR can then be incorporated to obtain an additional performance improvement. This font information, however, is somewhat diluted by the fact that all characters across the plate are taken into account simultaneously; it is the accuracy across the plate code that is considered when determining which font is the "winner".

The disclosed example embodiments thus address the limitations of the prior art by augmenting the MSC approach with a set of single character image classifiers, specially tuned to identify the differences in fonts between states or jurisdictions. At runtime, the plate code result from OCR and the MSC prediction for the state are used to first determine whether or not this mask/starting character combination is one of a predetermined set of "difficult" cases (i.e., those with heavy overlap for which the standard technique performs poorly). If so, then the OCR and MSC data can be utilized to determine which character on the license plate will be most discriminative from a state identification perspective. The segmented image for this character is then run through an image-based classifier designed to differentiate between two possible states (the two that cause the most confusion for the standard MSC method). The result can then be used as the predicted state for the overall license plate image.

Figure 4:
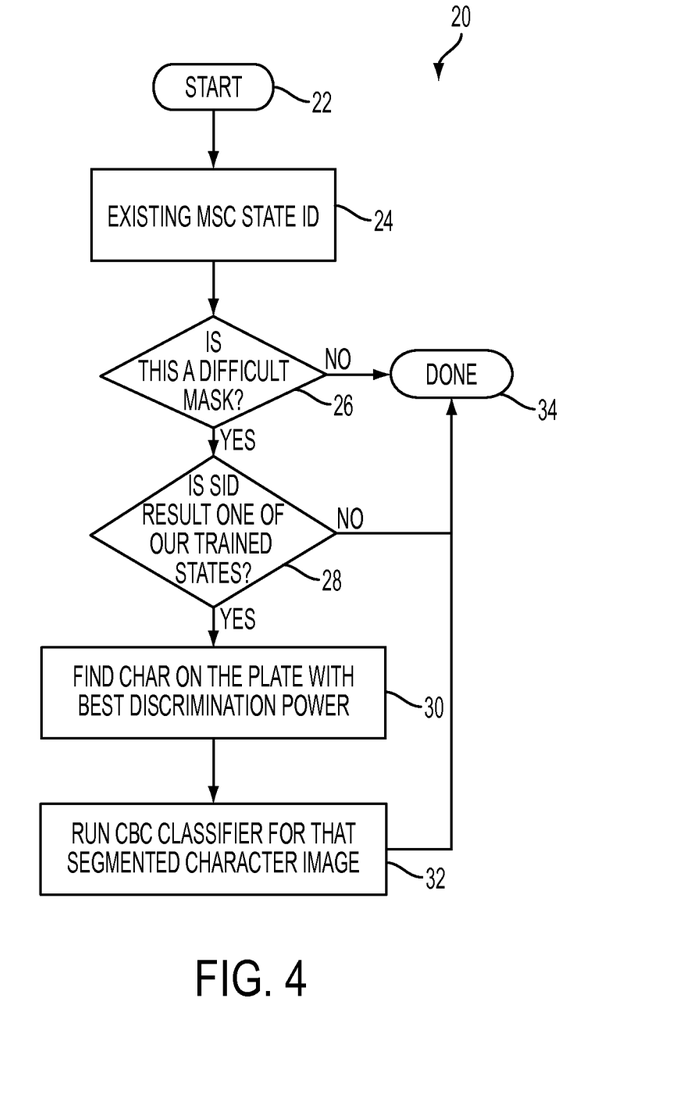
FIG. 4 illustrates a flowchart of operations depicting logical operational steps of a method for leveraging character-by-character image classifiers to improve license plate state or jurisdictional identification, in accordance with a preferred embodiment.

FIG. 4 illustrates a flowchart of operations depicting logical operational steps of a method 20 for leveraging character-by-character image classifiers to improve license plate state or jurisdictional identification, in accordance with a preferred embodiment. As indicated at block 22, the process begins. Thereafter, as shown at block 24, an operation can be implemented for existing MSC state identification (ID). Note that the term "state" or "jurisdictional" as utilized herein refers not only to U.S. states where vehicles are licensed, but also to foreign countries, provinces, and so forth where vehicle can also be licensed.

Following the processing of the operation shown at block 24, a test can be implemented as shown at decision block 26 to determine if this plate code constitutes a difficult mask based on the existing MSC state ID shown in block 24. If not, then the process ends, as depicted at block 34. If so, then as shown next at decision block 28, a test can be performed to determine if the SID (State ID) result matches a trained state. If not then process ends, as illustrated at block 34. If a match is determined, a step or logical operation can be implemented, as shown at block 30 to find the character or characters) on the license plate with the best discrimination power. Thereafter, as described at block 32, a step or operation can be implemented to run the CBC classifier for that segmented character image. The process then terminates, as shown at block 34.

Note that an experimental embodiment of an ALPR system was installed recently in a tolling facility in the State of New Hampshire (NH). For this particular installation, there are actually a significant number of out of state plates in circulation on the NH roadway. In addition, more significant overlap in the sequences was observed for these outside states than had previously been encountered for other installations. This situation causes a stress on the state identification module within the installed ALPR system and leads to a reduction in expected performance.

To address this problem, an experimental embodiment was tested on the NH image sets. First, the most difficult mask/starting character combinations were identified by analyzing the present state identification performance as indicated at block 24. These represent the opportunity cases in which the existing technique performs below the desired level of accuracy. For these cases, the top two overlapping states were identified. Sample character images were then used to train image-based classifiers that would discern between characters of each state, basically predicting the state from the segmented characters. In this example, HOG (Histogram of Oriented Gradient) features were utilized with an SVM classifier and all segmented character images were scaled to a nominal size of 50×25 pixels as part of preprocessing. Note that other features, for example, the Successive Mean and Quantization (SMQT) features could also be used.

Figure 5:
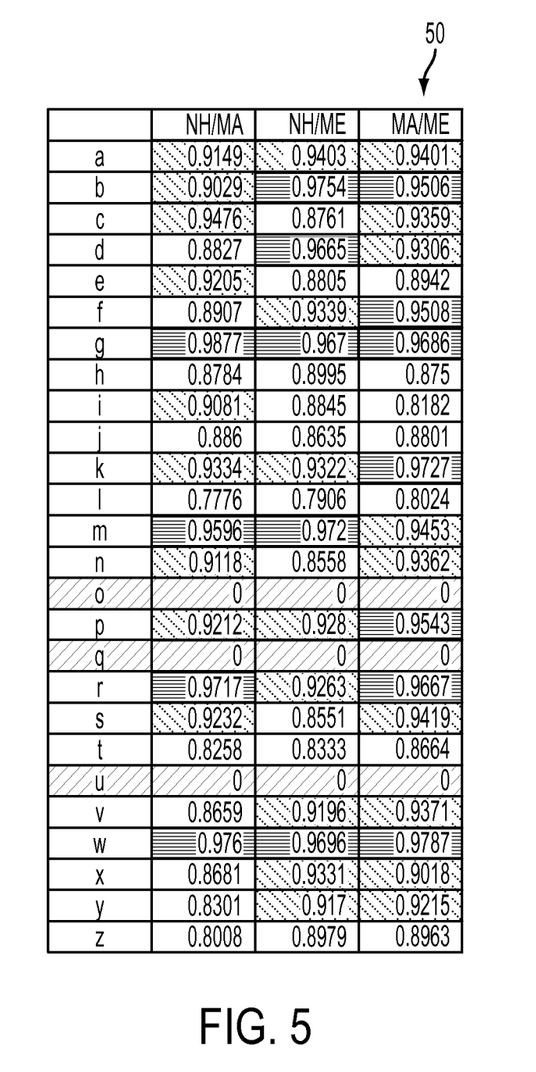
FIG. 5 illustrates a table of accuracy data (e.g., single character state classification accuracies), in accordance with an example embodiment.

The resulting accuracy of the image-based classifiers trained on the NH data set across the top three states of interest—New Hampshire (NH), Massachusetts (MA), and Maine (ME)—are shown in FIG. 5. Note that since "O", "Q", and "U" are often excluded in state fonts, these cases were not trained/evaluated. One can quickly see from these results that in fact the single character image-based method does in fact provide highly accurate results for many cases. Although the data shown in FIG. 5 as discussed below can be employed for pairwise classifiers (e.g., NH versus MA), the disclosed embodiments can also include the use of a multi-class rather than just a binary classification approach.

Figure 6:
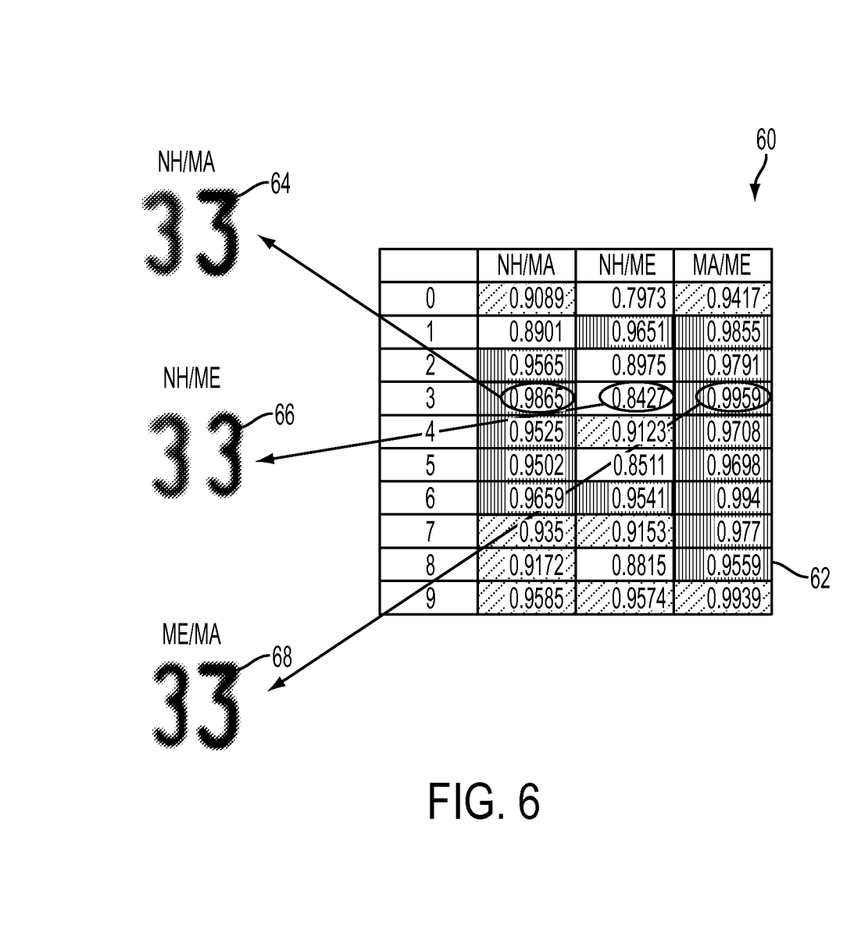
FIG. 6 illustrates a sample table of data indicating a comparison made between the fonts and associated CBC classification accuracy for the symbol "3" in accordance with an example embodiment.

FIG. 5 illustrates a table 50 of accuracy data (e.g., single character state classification accuracies), in accordance with an example embodiment. Another aspect of the disclosed embodiments is the evaluation of which single-character classifier is to be used. From the accuracy data shown in Table 50 in FIG. 5, it is clear that some characters provide more accurate discrimination between states than do others. This is highlighted or shown in shadows in FIG. 6, which illustrates a sample table 60 of data indicating a comparison made between the fonts and associated CBC classification accuracy for the symbol "3" in accordance with an example embodiment. Obviously the more visually different the fonts are for a given symbol, the stronger the discriminative ability of that symbol is for that pair of states.

Leveraging this fact, at runtime the present method includes an evaluation of the license plate code from OCR. Based on the symbols predicted to be present in the plate, the method scans a table of classifier accuracies (learned offline at design time). For the characters that are actually present in a given license plate, the disclosed approach can then select the single character image that should provide the best discrimination between states, as shown at block 32 in FIG. 4.

Figure 7:
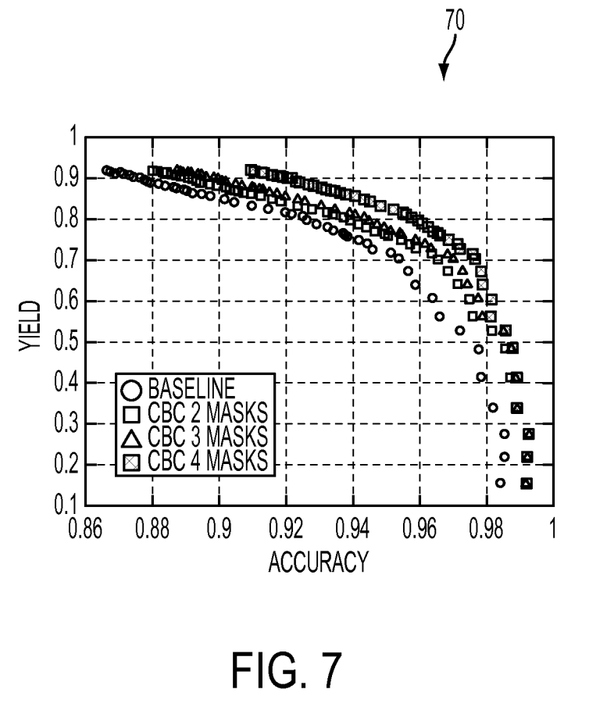
FIG. 7 illustrates a graph indicating a sample ALPR system performance, accordance with an example embodiment.

FIG. 7 illustrates a graph 70 indicating a sample ALPR system performance, in accordance with an example embodiment. The performance of the proposed approach was compared to that of the baseline MSC approach on a sample set of 5 k license plate images from a NH tolling installation. The ALPR system was modified to allow for either the baseline state identification or the disclosed embodiments.

The results (e.g., yield versus accuracy performance) of system runs on these 5 k test images are given in graph 70 in FIG. 7. In this example set of results, the disclosed approach was run for three different cases, addressing varying numbers (2, 3, or 4) of "difficult" masks for the existing MSC method. The benefits of the disclosed approach are clear, showing a 1% accuracy improvement at the high end or an almost 20% yield improvement at 98% accuracy.

Note that the results depicted in graph 70 of FIG. 7 include the contribution of OCR. In other words, some of the errors that affect the overall accuracy in this set of curves may be caused by the OCR producing a code with mistakes therein. So, another way to look at the performance of state identification is to de-couple it from the OCR contribution. This can be seen in Table 1 wherein the error rates of different state identification approaches are compared only for those cases in which the OCR code is correct. This is, in some sense, a more accurate representation of how the state identification subsystem itself is performing. Once again, the benefits of the disclosed approach are clearly evident.

TABLE 1

Error rates for state identification when plate code is correct

| Run | SID Err Rate |
|---|---|
| Baseline | 6.47% |
| CBC - 2 masks | 5.19% |
| CBC - 3 masks | 4.52% |
| CBC - 4 masks | 2.64% |

The advantage of combining the character-by-character image classification method with an existing primary approach (i.e., here it is MSC, but can be implemented according to other state identification methods) is that the character-by-character (CBC) method is leveraged where it will help the most, without hurting the other cases. After all, accuracies of 96% for the CBC method are significant for cases that begin at, for example, 60% using prior art approaches. For the most part, however, the MSC based method already achieves 99% plus levels of performance across many license plate formats and states of interest. Thus, by combining the two approaches as discussed herein, substantially improved overall accuracies can be achieved.

If one were to attempt to run the CBC method alone across all characters and combine the results into a single conclusion, one would also run into the problem of error propagation. That is, the opportunities for making mistakes propagate. For example, it is necessary to be accurate with respect to the first symbol, the second symbol, and so on. This means taking the individual accuracies and multiplying them together to obtain the overall expected accuracy. This is one of the primary difficulties for OCR of license plates (e.g., requiring 99.97% individual character accuracy to achieve an overall accuracy of 99% for a 7 character plate). So, a solution approach that attempted to leverage CBC alone in this manner would be impractical based on the single character performances observed in FIG. 5.

As can be appreciated by one skilled in the art, embodiments can be implemented in the context of a method, data processing system, or computer program product. Accordingly; embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java. C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network, e.g., Wi-Fi, Wimax, 802.xx, and cellular network, or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 8:
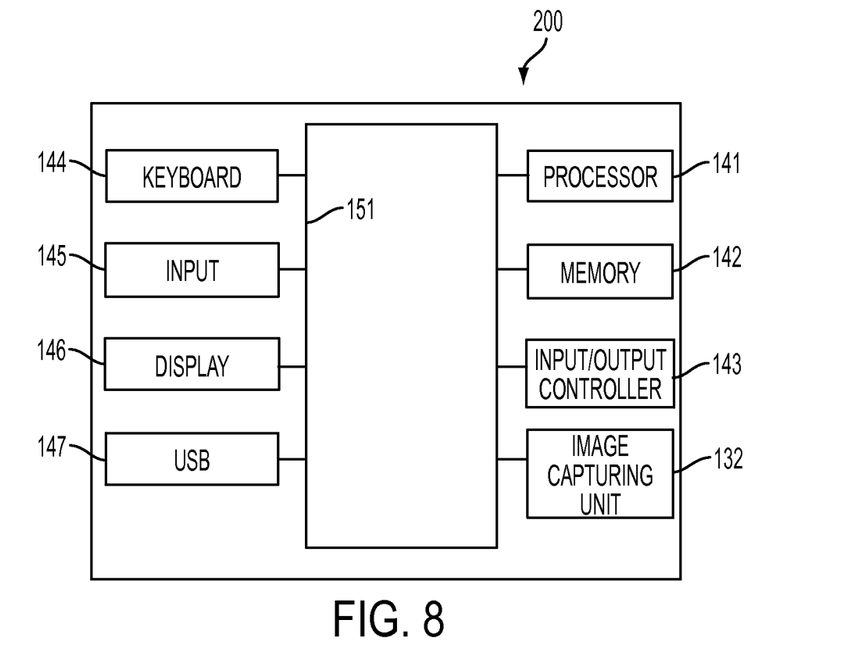
FIG. 8 illustrates a schematic view of a computer system, in accordance with an embodiment.
Figure 9:
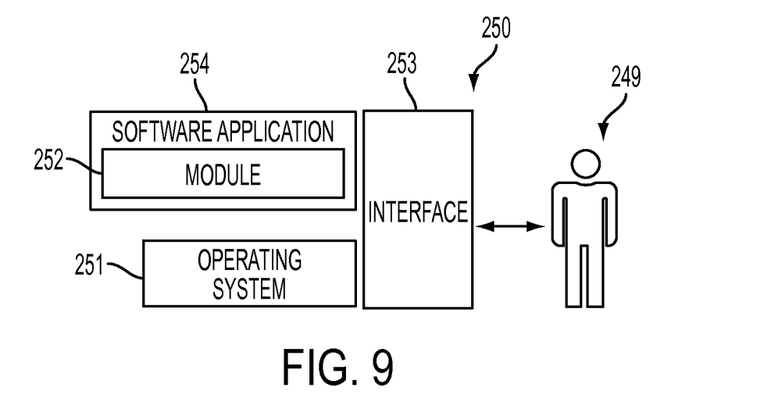
FIG. 9 illustrates a schematic view of a software system including a module, an operating system, and a user interface, in accordance with an embodiment.

FIGS. 8-9 are provided as exemplary diagrams of data-processing, environments in which embodiments of the present invention may be implemented. It should be appreciated that FIGS. 8-9 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 8, some embodiments may be implemented in the context of a data-processing system 200 that includes, for example, a processor 141, a memory 142, an input/output controller 143, an image capturing unit or camera(s) 132 (e.g., ALPR video camera), a keyboard 144, an input device 145 (e.g., a pointing device, such as a mouse, track ball, and pen device, etc.), a display 146, and a USB (Universal Serial Bus) peripheral connection 147. As illustrated, the various components of data-processing system 200 can communicate electronically through a system bus 151 or similar architecture. The system bus 151 may be, for example, a subsystem that transfers data between, for example, computer components within data-processing system 200 or to and from other data-processing devices, components, computers, etc.

FIG. 9 illustrates a computer software system 250 for directing the operation of the data-processing system 200 depicted in FIG. 8. Software application 254, stored for example in memory 142, generally includes a kernel or operating system 251 and a shell or interface 253. One or more application programs, such as software application 254, may be "loaded" (i.e., transferred from, for example, a mass storage or other memory location into the memory 142) for execution by the data-processing system 200. The data-processing system 200 can receive user commands and data through an interface 253; these inputs may then be acted upon by the data-processing system 200 in accordance with instructions from operating system 251 and/or software application 254. The interface 253 in some embodiments can serve to display results, whereupon a user may supply additional inputs or terminate a session. The software application 254 can include a module 252 that can implement instructions or logical operations such as those shown, for example, in blocks 22, 26, 28, 30, 32, and 34 of FIG. 4.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. The module 252 shown in FIG. 9 can thus implement instructions such as those shown in, for example, blocks 22-34 depicted and described herein with respect to FIG. 4.

FIGS. 8-9 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that a number of embodiments, preferred and alternative, are disclosed herein. It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

The invention claimed is:

1. A method for enhancing the accuracy of license plate state identification, said method comprising:
   training at least one character-by-character image-based classifier that differentiates between at least two possible different states including, distinguishing between fonts on license plate images with respect to said at least two possible different states;

determining at least one character among a plurality of characters on a license plate image that provides a high discriminatory power for arbitrating between candidate state results with respect to said at least two possible different states; and applying said at least one character-by-character image-based classifier to said at least one character to provide a final selection among said candidate state results of an estimated state or jurisdiction associated with said license plate image.

2. The method of claim 1 further comprising employing an OCR result to determine which character on said license plate image provides said high discriminatory power.

3. The method of claim 1 further comprising capturing said license plate image via an image-capturing device.

4. The method of claim 3 wherein said image-capturing device comprises an ALPR camera.

5. The method of claim 1 wherein applying said at least one character-by-character image-based classifier to said at least one character to provide a final selection among said candidate state results of an estimated state or jurisdiction associated with said license plate image, further comprises:
    segmenting said at least one character; and
    running said at least one character-by-character image-based classifier with respect to said at least one character after said at least one character is segmented.

6. The method of claim 1 wherein said at least one character-by-character image-based classifier comprises a pairwise classifier based on binary classification.

7. The method of claim 1 wherein said at least one character-by-character image-based classifier comprises a multiclass classifier.

8. The method of claim 2 wherein applying said at least one character-by-character image-based classifier to said at least one character to provide a final selection among said candidate state results of an estimated state or jurisdiction associated with said license plate image, further comprises:
    segmenting said at least one character; and
    running said at least one character-by-character image-based classifier with respect to said at least one character after said at least one character is segmented, said running of said at least one character-by-character image-based classifier further comprises scanning a table of classifier accuracies.

9. The method of claim 8 wherein said at least one character-by-character image-based classifier comprises a pairwise classifier based on binary classification, wherein said table of classifier accuracies is learned offline.

10. The method of claim 8 wherein said at least one character-by-character image-based classifier comprises a multiclass classifier, wherein said table of classifier accuracies is learned offline.

11. A system for enhancing the accuracy of license plate state identification, said system comprising: at least one processor; and a computer-usable medium embodying computer program code, said computer-usable medium capable of communicating with said at least one processor, said computer program code comprising instructions executable by said at least one processor and configured for:
    training at least one character-by-character image-based classifier that differentiates between at least two possible different states including distinguishing between fonts on license plate images with respect to said at least two possible different states;
    determining at least one character among a plurality of characters on a license plate image that provides a high discriminatory power for arbitrating between candidate state results with respect to said at least two possible different states; and
    applying said at least one character-by-character image-based classifier to said at least one character to provide a final selection among said candidate state results of an estimated state or jurisdiction associated with said license plate image.

12. The system of claim 11 wherein said instructions are further configured for employing an OCR result to determine which character on said license plate image provides said high discriminatory power.

13. The system of claim 11 further comprising capturing said license plate image via an image-capturing device.

14. The system of claim 13 wherein said image-capturing device comprises an ALPR camera.

15. The system of claim 11 wherein said instructions for applying said at least one character-by-character image-based classifier to said at least one character to provide a final selection among said candidate state results of an estimated state or jurisdiction associated with said license plate image, further comprise instructions configured for:
    segmenting said at least one character; and
    running said at least one character-by-character image-based classifier with respect to said at least one character after said at least one character is segmented, wherein said running of said at least one character-by-character image-based classifier further comprises scanning a table of classifier accuracies.

16. The system of claim 11 wherein said at least one character-by-character image-based classifier comprises a pairwise classifier based on binary classification.

17. The system of claim 11 wherein said at least one character-by-character image-based classifier comprises a multiclass classifier.

18. A system for enhancing the accuracy of license plate state identification, said system comprising:
    at least one camera;
    at least one character-by-character image-based classifier that communicates with said at least one camera and differentiates between at least two possible different states including distinguishing between fonts on license plate images with respect to said at least two possible different states;
    wherein at least one character is determined among a plurality of characters on a license plate image captured by said a least one camera that provides a high discriminatory power for arbitrating between candidate state results with respect to said at least two possible different states; and
    wherein said at least one character-by-character image-based classifier is applied to said at least one character to provide a final selection among said candidate state results of an estimated state or jurisdiction associated with said license plate image.

19. The system of claim 17 wherein an OCR result is employed to determine which character on said license plate image provides said high discriminatory power.

20. The method of claim 18 wherein said at least one character-by-character image-based classifier is applied to said at least one character to provide a final selection among said candidate state results of an estimated state or jurisdiction associated with said license plate image by:

segmenting said at least one character; and running said at least one character-by-character image-based classifier with respect to said at least one character after said at least one character is segmented, wherein said running of said at least one character-by-character image-based classifier further comprises scanning a table of classifier accuracies.

\* \* \* \* \*